Dec. 2, 1941. E. J. ABBE 2,264,733
CHASSIS STRUCTURE FOR INDUSTRIAL TRUCKS
Filed Dec. 30, 1939
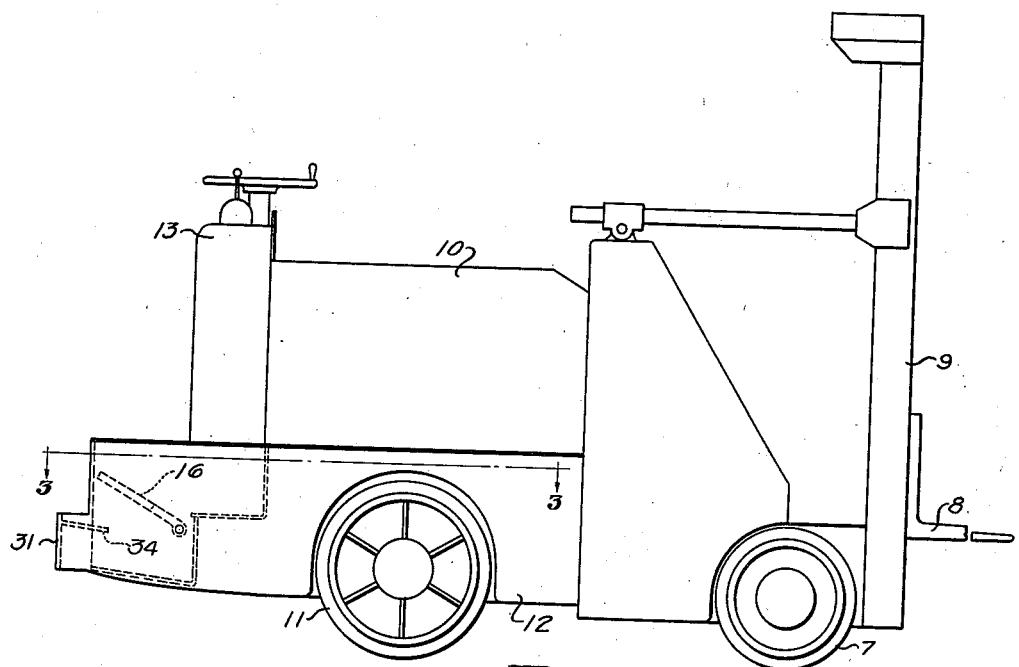
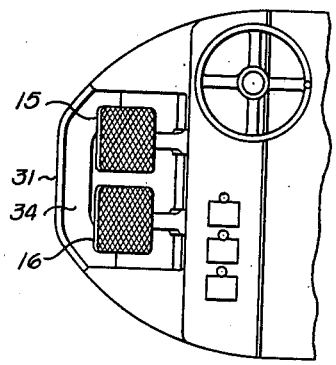
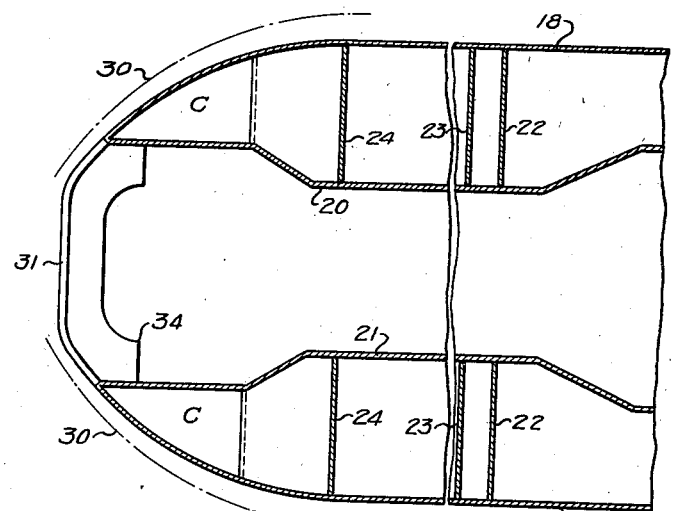
INVENTOR.
EDWARD J. ABBE
BY
ATTORNEYS.

Patented Dec. 2, 1941

2,264,733

UNITED STATES PATENT OFFICE 2,264,733

CHASSIS STRUCTURE FOR INDUSTRIAL TRUCKS

Edward J. Abbe, Cleveland Heights, Ohio, assignor to The Elwell-Parker Electric Co., Cleveland, Ohio, a corporation of Ohio Application December 30, 1939, Serial No. 311,746

11 Claims. (Cl. 280—106)

This invention is concerned with industrial trucks, and more particularly with chassis structures for such trucks.

The general object of the present invention is to provide an improved chassis structure for industrial trucks of the type wherein the operator is positioned on a platform disposed at one end of the truck, the chassis structure being such that the operator will be protected against injury when on the platform.

A still further object of the present invention is the provision of a chassis structure for trucks of the end platform operated type, and which will incorporate provision for the inclusion of counterweights at extended positions relative to the main part of the truck body without increasing the minimum aisle clearance requirements for complete maneuverability of the truck.

A further object of the present invention is the provision of a chassis structure for an industrial truck of the above mentioned type, which can be built up of metal panels in such manner as to eliminate all external structural protrusions.

Other objects of the present invention will become apparent to those skilled in the art from the following description of a preferred embodiment of the invention, which is disclosed in the accompanying drawing. The essential characteristics of the invention are summarized in the claims.

In the drawing Fig. 1 is a side elevation embodying a chassis structure containing the features of my invention; Fig. 2 is a fragmentary plan view of one end of the truck shown in Fig. 1, and Fig. 3 is an enlarged cross-sectional view taken substantially along the line 3—3 of Fig. 1.

My invention contemplates the provision of an industrial truck frame structure preferably formed or built up of steel plates or panels, welded together to form a body and chassis structure in which all protrusions, such as bolts, rivet heads, etc., are eliminated. The chassis structure is such as to effectively enclose an operator's platform usually attached to one end of the truck frame, and in such manner as to protect the operator of the truck when standing upon the platform. The chassis structure is also arranged to protect the platform in the event of end collision of the truck with obstructions. The end structure of the chassis is arranged in such manner that the extensions thereof which form side protection for the platform and the operator thereon also may comprise a counterweight or may comprise a repository for counter-weights. The foregoing features are accomplished by shaping extensions formed on the truck chassis and particularly the outerside surfaces thereof to conform approximately to the minimum clearance curvature usually specified for trucks of the class to which this invention pertains.

In the drawing, in Fig. 1, I show an embodiment of my invention incorporated in a truck structure wherein the truck mechanism is adapted to engage loads which overhang the truck frame, as, for example, by a load-engaging carrier 8, which is elevatable upon an upright frame 9 carried or mounted at one end of the truck. The truck is provided with appropriate actuating mechanism for the load-engaging means but omitted from the present drawing, as the same comprises no part of this invention. The truck frame is mounted upon pairs of dirigible wheels 7 and 11 and the frame comprises a housing 10 which encloses a power plant in the form of storage batteries for powering a motor or a gas engine for driving the truck wheels 11. The truck frame includes a chassis structure generally indicated by the reference numeral 12 and preferably formed out of steel plates, welded together in a manner to be hereinafter described.

Various control mechanisms for controlling the truck driving means, the steering means, and the load elevating means is generally indicated by the reference numeral 13, the same being positioned at one end of the truck above an operator's platform disposed in overhanging relation to the truck frame. The platform usually comprises two pedal members 15 and 16 hingedly connected to the truck chassis. The pedal members are associated with the braking mechanism and the power control of the truck and are in the position indicated by the dotted lines in Fig. 1, when the operator is not in position upon the truck. One of the pedals or platforms is so connected to the braking mechanism that the weight of the operator upon the pedal is required to maintain the vehicle brake in an inactive condition.

The chassis structure forming the lower part of the truck frame comprises two side sill constructions, having outer plates or panels 18 and 19, and inner plates 20 and 21, which are cross-braced by plates 22, 23 and 24, all of the plate members being joined preferably by welding. The outer plates 19 are curved near the operator's end of the truck to converge toward the operator's position and the curvature of the plates 18 and 19 is such as to approximate the minimum steering clearance radii 30, whereby a maximum bulk of chassis structure within the clearance tolerance can be obtained. The inner plate members 20 and 21 of the sill structure are formed and spaced apart to provide a platform space therebetween (see Fig. 3) and spaces designated by the reference numerals C are also formed between the platform space and the curved plates 18 and 19 to provide compartments for the reception and storage of counter-weights.

At the operator's end of the chassis structure, a reinforcing cross-panel 31 is provided, which is joined to the ends of the two sill structures to form a protective bumper for the platform members 15 and 16, and to protect an operator when standing thereon from injury due to collision. It will be noted that the height of the plate members 18, 19, 20 and 21 of the side sill structures is such as to sidewise enclose the operator's station on the truck, as shown in Fig. 1. A rest plate 34 may be secured to the inner side of the end panel 31 and to the inner plates 20 and 21 of the sill structures to form a reinforcing means for the end panel 31, as well as to form a rest for the platform members 15 and 16, when the operator is positioned thereon.

In the truck disclosed, the four wheels are dirigible and a minimum swinging or turning radius is usually specified and within the bounds of which all protruding parts of the truck must lie. By extending the sill structures which form the sides of the truck chassis outwardly to enclose the operator's platform in the manner disclosed, it is possible to have the counterweights overhang the wheels 11 a greater distance than heretofore. The lifting capacity of the truck, insofar as tipping difficulties are concerned, is increased. While thus increasing this counterbalancing feature, I also provide a chassis structure which serves to protect the operator. The arrangement lends itself to a streamlined design of the truck frame and all protuberances can be eliminated and the entire arrangement does not necessitate any increase of aisle space for maximum maneuverability.

It will be understood that the sill structure as shown in Fig. 3 continues to the load handling end of the truck, at which end the sill structures may be shaped to provide various types of load-engaging mechanisms.

I claim:

1. A chassis structure for an industrial truck of the end platform type, having welded steel plates forming the side sills of the chassis, and the side sill formations being extended along the sides of the platform and formed to comprise compartments for truck counterweights and cross-panelling connected to the outer ends of said extensions to form an enclosure for an operator's platform.

2. A chassis structure for an industrial truck of the end platform type, comprising welded metal panels forming side sills of the chassis, the side sill formations being extended above and below and along the sides of the operator's platform such extensions being constructed to comprise compartments for truck counterweights and cross-panelling connected to the outer ends of said extensions to form an end enclosure for an operator's platform.

3. A chassis structure for an industrial truck built up of steel plates to have side sills, the extending ends of which have the outer surfaces thereof curved to approximate the minimum clearance curve of the truck as determined by the dirigible limits of the truck, there being a space provided between said side sill extensions for an operator's platform and counterweight pockets formed in the side sills between said platform space and the curved portions of the chassis.

4. A chassis structure for an industrial truck built up of steel plates to have side sills, the extending ends of which have the outer surfaces thereof curved to approximate the minimum clearance curve of the truck as determined by the dirigible limits of the truck, there being a space provided between said side sill extensions for an operator's platform and counterweight pockets formed in the sill extensions between said platform space and the curved portions of the chassis, and a cross-panel structure connecting the sill extensions to protect the outer end of a platform when disposed in said space.

5. A chassis structure for an industrial truck built to have side sills, the outer surfaces of the extending ends thereof being curved to approximate the minimum clearance curve of the truck as determined by the dirigible limits of the truck, there being a space provided between said side sill extensions for an operator's platform and the side sills being constructed to extend above and below the platform level, and hollow counterweight pockets formed in the extending ends between said platform space and the curved portions of the chassis.

6. In an industrial truck of the end controlled type, the combination of a truck chassis built up of two pairs of vertically extending plates, one pair on each side of the truck, the inner plates being spaced apart to provide accommodations for an operator's platform at one end of the chassis, the inner plates being spaced from the outer plates, the platform adjacent end of each pair of plates being joined, and a pair of spacing plates one for each of said pairs of plates whereby there is presented a counterweight pocket at the platform adjacent end of each of said pairs of plates.

7. In an industrial truck of the end controlled type, a truck chassis comprising two spaced pairs of vertical side plates, the plates of each pair being spaced from each other and connected at one end, and a pair of spacer plates one for each of said pairs of plates for maintaining the same in spaced relation, said connected ends being adapted for supporting an operator's platform therebetween, whereby there is presented on each side of the operator's platform a pocket for the reception of counterweights or the like.

8. In an industrial truck of the end controlled type, a truck chassis comprising pairs of spaced side plates adapted for receiving an operator's platform between the adjacent ends thereof and panelling secured to each end of each pair of plates and disposed in the space between each pair of plates, whereby there is presented at each of said ends a pocket for counterweights or the like.

9. In an industrial truck of the end control type, the combination of a truck chassis having a control pedal connected to the operator's end of the chassis, said pedal being adapted for controlling the operation of the truck, said chassis having a side sill construction formed integrally with the chassis and extending on each side of the pedal, said side sill construction extending above the level of the pedal and enclosing the pedal and serving as a guard for the operator when on the pedal and as a part of the counterweight means for the truck, and a cross structure extending tranversely of the chassis and connecting the rear portions of said side sills, said cross structure extending to a sufficient height to enclose and protect a portion of said foot pedal.

10. A chassis structure for an industrial truck of the end platform overhanging load type provided with truck wheels, said structure having side sills extending from points forwardly of said wheels to points rearwardly thereof, the ends of said side sills being hollow and forming counterweight compartments extending on each side of the platform location at the operator's end of the truck.

11. A chassis structure for an industrial truck of the end controlled type, comprising side sills disposed adjacent the controlled end of the truck, the ends of said sills being hollow so as to form hollow compartments adapted to receive counterweights for said truck.

EDWARD J. ABBE.